2,909,538

PREPARATION OF HYDROXY ACIDS

Isidor Kirshenbaum, Westfield, Vincent L. Hughes, Clark, and Fred W. Banes, Westfield, N.J., assignors to Esso Research and Engineering Company, a corporation of Delaware No Drawing. Application December 10, 1957
Serial No. 701,716

7 Claims. (Cl. 260—409)

This invention relates to the preparation of hydroxy acids by reacting an unsaturated fatty acid with carbon monoxide and hydrogen at elevated temperatures and pressures in the presence of a carbonylation catalyst. More specifically, this invention relates to a one step process of preparing hydroxy acids from unsaturated acids in the presence of certain reaction modifier solvents.

It is of course well known that various compounds containing an olefinic linkage can be reacted with carbon monoxide and hydrogen under certain temperatures to add onto one of the olefinic carbon atoms a carbonyl group. This process, now conventionally known as the oxo process, may be applied to many different types of carbon to carbon double bond containing compounds including olefins, unsaturated alcohols, unsaturated acids, unsaturated ethers and the like. In general, however, if the alcohol is the desired end product it is necessary to subject the aldehyde formed in the first or oxo stage to a hydrogenation step, usually in the presence of a hydrogenation catalyst, to effect the preparation of the desired alcohol. Thus for the preparation of hydroxy containing compounds it is necessary to carry out the preparation thereof in two stages as exemplified by the following reactions:

(1)
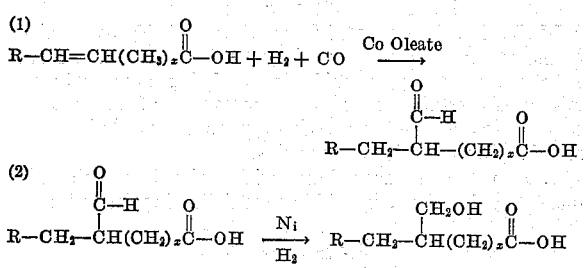

(2)
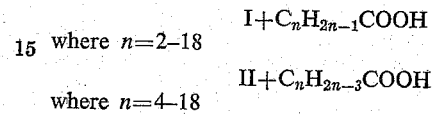

X represents an integer from 0 to 18+.

Although in reaction some hydroxy acid is formed the selectivity strongly favors the aldehyde acid synthesis.

It has now been discovered that reaction 1 above may be modified by the use of certain reaction modifier solvents to selectively effect the direct single stage hydroxylation of unsaturated fatty acids to the corresponding hydroxy acids in the following manner:

(3)
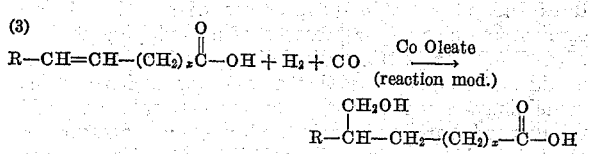

The reaction modifier solvents which effect the desired results are the low molecular weight non-tertiary alcohols. By low molecular weight it is meant to include alcohols containing from 2 to 8 carbon atoms, such as ethanol, propanol, isopropanol, butanol, isobutanol, hexanol, 2-ethyl butanol, 2-ethyl hexanol, oxo isooctyl alcohol and the like. Tertiary alcohols have been found to be unstable under conditions of reaction contemplated thereby forming dehydration products such as olefinic hydrocarbons. Preferably the $C_3$-$C_8$ alcohols branched or straight chain are employed. The alcohol reaction modifier is suitably employed in an alcohol/feed volume ratio of 0.5/1 to 5/1 preferably 0.75/1 to 2/1.

Unsaturated fatty acids which are amenable to the present process are those containing at least one but less than three carbon to carbon double bonds. These fatty acids therefore fall into two categories:

$$I + C_nH_{2n-1}COOH$$

where $n = 2$–$18$ $$II + C_nH_{2n-3}COOH$$

where $n = 4$–$18$

In the first group, i.e. the acrylic acid group, are included acrylic acid, butenic acids, pentenic acids, teracrylic acid, hypageic acid, oleic acid, elaidic acid, erucic acid and the like. The second group include sorbic acid, linoleic acid and the like.

When hydroxylating an acid or Group I supra in accordance with this invention the product will be a monohydroxy fatty acid. However, hydroxylation of a Group II acid in accordance with this invention may result in a dihydroxy acid, a monohydroxy acid or mixtures of the two. The reason for the formation of monohydroxy acids from a fatty acid containing two unsaturated groups is that there is a tendency for the double bonds to saturate under the conditions of reaction.

Relatively low cost source for the unsaturated acid reactants is tall oil. Tall oil which is derived from wood during sulfate pulping comprises approximately equal amounts of rosin and fatty acids. A typical fatty acid fraction of tall oil contains about 45 wt. percent oleic acid (Group I), 48 wt. percent linoleic acid (Group II), 6–7 wt. percent palmitic acid (saturated) and trace amounts of other acids. It is therefore contemplated herein to employ as reactants not only single unsaturated fatty acids but mixtures thereof in any desired proportion.

The hydroxylation of the unsaturated fatty acids is preferably carried out in a reaction tower similar to that conventionally employed in the well known oxo synthesis. The tower if desired may be packed with inert material such as Raschig rings and the like. Any conventional carbonylation catalyst may be employed in the present hydroxylation reaction and these include cobalt oleate, cobalt stearate, cobalt acetate, cobalt oxide, cobalt carbonate, cobalt carbonyl, metallic cobalt and the like. Various other carbonylation catalysts are known to the art and it is not deemed necessary to reiterate the long lists of such catalysts. Rather, it is emphasized that any conventional carbonylation catalyst may be suitably employed in this process.

The catalyst is employed in the ratio of 0.05 to 0.5 wt. percent, preferably from 0.1 to 0.25 based on the acid feed. Temperature within the reactor may vary between 100° to 200° C. In general, the higher molecular weight fatty acids will require higher temperatures and higher catalyst concentration since they are more difficultly hydroxylated. Conversely, the lower molecular weight unsaturated fatty acids may be reacted at lower temperature conditions and smaller concentrations of catalyst. Pressures and hydrogen to carbon monoxide ratio may be the same as those conventionally employed in the oxo reaction, e.g. 1500 to 7500 p.s.i.g. and from 0.5/1 to 5/1 $H_2$/CO.

For a clearer understanding of the present invention the following examples are set forth:

EXAMPLE 1

This example employs as a solvent hexane for comparative purposes. 450 grams of a fatty acid fraction of tall oil having the composition previously described were reacted at 175° C. with 0.1 wt. percent preformed cobalt carbonyl at 3500 p.s.i.g. and a H₂/CO ratio of 1/1, in the presence of hexane solvent with a feed/solvent volume ratio of 0.9/1. After 4 hours the reaction was completed with a 95% conversion. The following yields were obtained:

*Wt. percent on the fatty acid feed*

| | Percent |
|---|---|
| Hydroxy acid | 48 |
| Aldehyde acid | 47 |

The reaction mixture was then oxidized at about 45° to 50° C. with 32 liters of air/min./kg. of product for 5 hours to convert the aldehyde acid into dibasic acid. Complete oxidation results in a product containing 48 wt. percent hydroxy acid and 47 wt. percent dibasic acid.

It will be seen from the above example that the oxonation of fatty acids employing conventional solvents such as hexane results in approximately equal yields of aldehyde acid and hydroxy acid.

The following example was carried out in accordance with the process of the present invention employing a preferred reaction modifier solvent.

EXAMPLE 2

The same tall oil fatty acid fraction as employed in Example 1 was "hydroxylated" in the same manner as shown in Example 1 with the use of isopropyl alcohol instead of hexane and a feed to solvent volume ratio of 1/1 and employing 0.2 wt. percent of preformed cobalt carbonyl for the same number of hours. The conversion level reached was 95%. The product obtained after hydroxylation contained 81 wt. percent hydroxy acid and only 14 wt. percent aldehyde acid, both based on the fatty acid feed. Subsequently, the product mixture was oxidized in the manner described in Example 1 to yield 14 wt. percent dibasic acid and 81 wt. percent hydroxy acid.

It will be seen from the above data that conventional oxonation of fatty acids results in a 52 wt. percent selectivity to the dibasic acid and 48 wt. percent selectivity to the hydroxy acid, whereas carrying out the reaction in the presence of reaction modifiers contemplated herein results in an 85 wt. percent selectivity to the hydroxy acid and 15 wt. percent selectivity to the dibasic acid.

EXAMPLE 3

Oleic acid, 450 grams, is mixed with 1.2 volumes of a light hydrocarbon diluent (heptane) and charged to a reactor. 0.25 wt. percent cobalt carbonyl to oleic acid is added. The reactor is pressured to 2000 p.s.i.g. with a mixture of carbon monoxide and hydrogen and raised to a temperature of 160° C. The reactor is cooled at the end of the reaction and the product is analyzed for hydroxy acid and aldehyde acid. The hydroxy content will be about 49%, the aldehyde 44%, with 7% unreacted acid.

When the same reaction is carried out with an alcohol, specifically butanol, as diluent, the product will contain about 89% of the hydroxy acid and only 6% of the aldehyde acid, an improvement of 50% in the conversion of aldehyde to alcohol in one step.

It will be seen from the above that the product contains both the desired hydroxy acid and small amounts of the aldehyde acid. Although in many cases this product mixture may be used as such, if it is desired to remove aldehyde acid contaminants from the mixture a solvent extraction process may be employed. In general the separation of aldehyde acids from hydroxy acids by solvent extraction may be carried out as follows:

Aqueous sodium bisulfite solution is contacted with the crude mixture for a short period of time with good agitation and then the phases are allowed to separate. The water is removed and a second dilute solution added if any aldehyde products remain in the organic phase. After two such extractions with solutions containing molar amounts of bisulfite equivalent to the aldehyde present in the solution, the organic phase is filtered, or centrifuged to remove solid material. This operation can be carried out batchwise or countercurrently as desired with available equipment. It is to be understood that any known means of separating the hydroxy acids from the aldehyde acids may be employed.

Alternatively, if desired the hydroxy acid contaminated with aldehyde acid may be oxidized as indicated in the examples above to convert the aldehyde acids to dibasic acids leaving unchanged the hydroxy acids. Dibasic acids are readily separated from hydroxy acids by precipitation employing select hydrocarbon solvents wherein the hydroxy acid is soluble and the dibasic acid forms a solid precipitate. The dibasic acids show a very low solubility in such hydrocarbon solvents as hexane, heptane, octane and the line.

Alternatively the desired hydroxy acid may be freed from the dibasic acid contaminants by distillation since the dibasic acids are non-distillable. This should be carried out at reduced pressure to minimize side reactions, such as esterification.

The hydroxy acids prepared by the present process may be employed in the preparation of poly esters, greases, specialty oils and the like. A typical well known us for these hydroxy acids is in grease making wherein a lithium or other alkali metal base is reacted with the hydroxy acid to form a soap of the hydroxy acid which is extremely suitable as a grease thickener.

What is claimed is:

1. A process for the production of hydroxy acids which comprises reacting an unsaturated carboxylic acid with carbon monoxide and hydrogen in the presence of a carbonylation catalyst at a temperature between 100–200° C. and a pressure of from 1500 to 7500 p.s.i.g. also in the presence of a non-tertiary alcohol containing from 3 to 8 carbon atoms, said alcohol being present in an amount from 0.5 to 5 volumes per volume of unsaturated carboxylic acid, and recovering a product containing substantial amounts of hydroxy acids.

2. A process in accordance with claim 1 wherein said unsaturated carboxylic acid has the following formula:

$$C_nH_{2n-1}COOH$$

where $n$ equals 2–18.

3. A process in accordance with claim 1 wherein said unsaturated carboxylic acid has the following formula:

$$C_nH_{2n-3}COOH$$

where $n$ equals 4–18.

4. A process for the production of hydroxy acids which comprises reacting an unsaturated carboxylic acid with carbon monoxide and hydrogen at elevated temperatures and pressures in the presence of a carbonylation catalyst and also in the presence of a modifying amount of a $C_3$–$C_8$ non-tertiary alcohol to produce a reaction product containing a major amount of hydroxy acids containing 1 more carbon atom per molecule than said unsaturated carboxylic acid and a minor amount of aldehyde acids and separating said hydroxy acids from the product mixture.

5. A process in accordance with claim 4 wherein said hydroxy acids are separated from the aldehyde acids by solvent extraction.

6. A process in accordance with claim 4 wherein said hydroxy acids are separated from the aldehyde acids by oxidizing the aldehyde acids to dibasic acids and precipitating the dibasic acids by contacting said product mixture with a hydrocarbon solvent.

7. A process in accordance with claim 4 wherein said aldehyde acids are oxidized to form the corresponding dibasic acids and the resulting product mixture is distilled to recover substantially dibasic acid free hydroxy acid product.

References Cited in the file of this patent

UNITED STATES PATENTS

| | | |
|---|---|---|
| 2,691,046 | Hasek | Oct. 5, 1954 |
| 2,802,843 | Tramm et al. | Aug. 13, 1957 |

FOREIGN PATENTS

| | | |
|---|---|---|
| 646,424 | Great Britain | Nov. 22, 1950 |